United States Patent [19]
Schneider

[11] 3,802,541
[45] Apr. 9, 1974

[54] DRIVEN DISC ASSEMBLY FOR A FRICTION CLUTCH

[75] Inventor: Gustav Schneider, Schweinfurt, Germany

[73] Assignee: Fichtel & Sachs AG, Schweinfurt am Main, Germany

[22] Filed: Nov. 8, 1972

[21] Appl. No.: 304,650

[30] Foreign Application Priority Data
Dec. 2, 1971 Germany............................ 2159690

[52] U.S. Cl........... 192/106.1, 192/106.2, 192/70.17
[51] Int. Cl..... F16d 3/14, F16d 13/68, F16d 13/69
[58] Field of Search........... 192/106.1, 106.2, 70.17, 192/30 V; 64/27 C, 27 F; 74/574

[56] References Cited
UNITED STATES PATENTS

| | | | |
|---|---|---|---|
| 3,578,121 | 5/1971 | Maurice............................ | 192/106.2 |
| 3,091,949 | 6/1963 | Sink................................ | 192/106.2 X |
| 2,613,515 | 10/1952 | Crutchley..................... | 192/106.2 X |
| 2,571,291 | 10/1951 | Reed............................. | 192/106.2 X |
| 2,314,948 | 3/1943 | Nutt................................ | 192/106.2 |
| 2,248,228 | 7/1941 | Goodwin........................ | 192/106.2 |

*Primary Examiner*—Samuel Scott
*Assistant Examiner*—Lance W. Chandler
*Attorney, Agent, or Firm*—Hans Berman

[57] ABSTRACT

A driven disc assembly of an automotive friction clutch in which the carrier for the friction facings transmits torque to the hub of the driven disc assembly by means of helical compression springs received in axially aligned openings of the hub and carrier, and a friction coupling between the hub and the carrier dampens relative angular oscillation of the hub and carrier, the friction coupling including an annular pressure plate integrally formed with axially projecting tubular pin elements. The elements are axially slidable in corresponding openings of one of two annular covers fixedly fastened to the hub. The carrier and two friction rings on opposite sides of the carrier are axially interposed between the pressure plate and the other cover, and the pressure plate is biased toward the other cover by cup springs or Belleville washers circling each pin element between the one cover and the pressure plate.

7 Claims, 4 Drawing Figures

DRIVEN DISC ASSEMBLY FOR A FRICTION CLUTCH

This invention relates to friction clutches, and particularly to an improved driven disc assembly for such a clutch in which torque is transmitted between the friction facings and the hub of the friction disc by springs resiliently impeding relative angular displacement of the hub and friction facings, and a friction coupling for damping angular oscillation of the hub and friction facings.

While driven disc assemblies of the type described above have been used successfully, their friction couplings are relatively complex and bulky. The structural differences between friction couplings having different damping characteristics are substantial so that it is not readily possible to modify a standard friction coupling for use under operating conditions different from those for which it was specifically designed.

It is an important object of this invention to provide a driven disc assembly of the general type described in which the damping characteristics of the friction coupling can be varied in a simple manner at low cost so that a friction disc assembly may be manufactured in a standard type on a large scale and adapted in an economical manner for the damping requirements of specific automotive vehicles.

With this object and others in view, as will presently become apparent, the invention provides the friction coupling in a driven-disc assembly of the type described with a pressure plate having two opposite faces radial relative to the axis of rotation of the assembly. The plate is associated either with the hub or with the carrier for the friction facings for joint rotation while being permitted axial movement. The plate, for this purpose, is provided with a plurality of pin elements which project axially from one of the radial faces thereof in angularly spaced relationship. The pin elements are movably received in respective openings in receptacle means on the associated hub or carrier. A friction ring is arranged axially adjacent the other radial plate face for axial movement toward and away from a position of frictional, torque transmitting engagement with the carrier if the pressure plate is associated with the hub, or vice versa. At least one cup spring is associated with each pin element and interposed between the first mentioned radial face of the pressure plate and the receptacle means.

Other features, additional objects, and many of the attendant advantages of this invention will readily become apparent from the following detailed description of a preferred embodiment when considered in connection with the appended drawing in which.

Figure 1:
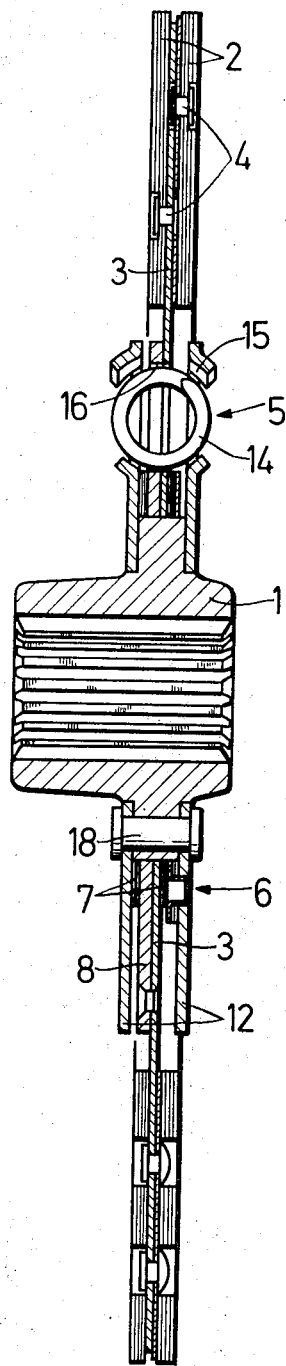
FIG. 1 shows a driven disc assembly of the invention in section on the line I — I in FIG. 2.

Referring now to the drawing in detail, there is shown a driven disc assembly having an internally splined hub 1 drivingly engaging the output shaft of a friction clutch in the assembled condition of the latter. Friction facings 2 of the disc assembly are secured on a flat, annular carrier 3 by means of rivets 4. Torque is normally transmitted from the friction facings 2 to the hub 1 by yieldably resilient means 5 and a friction coupling with which this invention is more specifically concerned.

Figure 3:
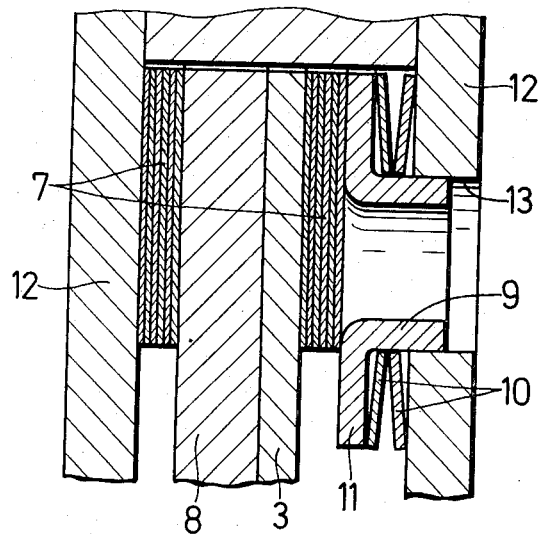
FIG. 3 shows a detail of the apparatus of FIG. 1 on a larger scale.
Figure 4:
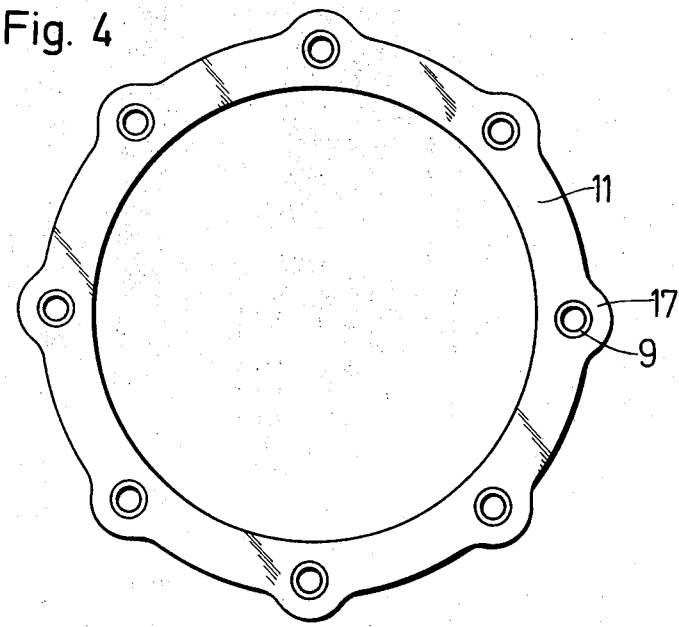
FIG. 4 shows an element of the apparatus obscured in the view of FIG. 2 on a larger scale.

As is better seen in FIG. 3, the radially inner portion of the relatively thin carrier 3 is reinforced with a heavier, flat, sheet metal ring 8, and the carrier 3 and ring 8 are axially flanked by two friction rings 7 made of similar material as the friction facings 2. The friction rings 7 are urged into frictional engagement with the reinforced carrier 3 by conically dished cup springs or Belleville washers 10 whose central apertures receive tubular pin elements 9 projecting axially from one radial face of an annular pressure plate 11. As is seen in FIG. 4, eight pin elements 9 are equiangularly distributed about the outer circumference of the plate 11 which has approximately semicircular, radial projections 17 radially aligned with respective elements 9. The several elements 9 and the pressure plate 11 constitute a unitary body of steel, the pin elements being formed by stamping an initially flat blank.

The hub 1 carrier two axially spaced cover discs 12 which are fixedly fastened to the hub and to each other by rivets 18. One of the cover discs 12 serves as a receptacle for the pin elements 9 in that it has eight openings 13 respectively receiving the elements 9 for axial movement while causing the pressure plate 11 to rotate jointly with the hub 1. The cup springs 10 are interposed between the afore-mentioned one cover disc 12 and the pressure plate 11. They drive the pressure plate 11 against the adjacent friction ring 7, and the latter axially into a position of frictional, torque transmitting engagement with the carrier 3. The other friction ring 7 is axially interposed between the carrier 3 with its associated reinforcing ring 8 and the other cover disc 12 so as to back the carrier 3.

Figure 2:
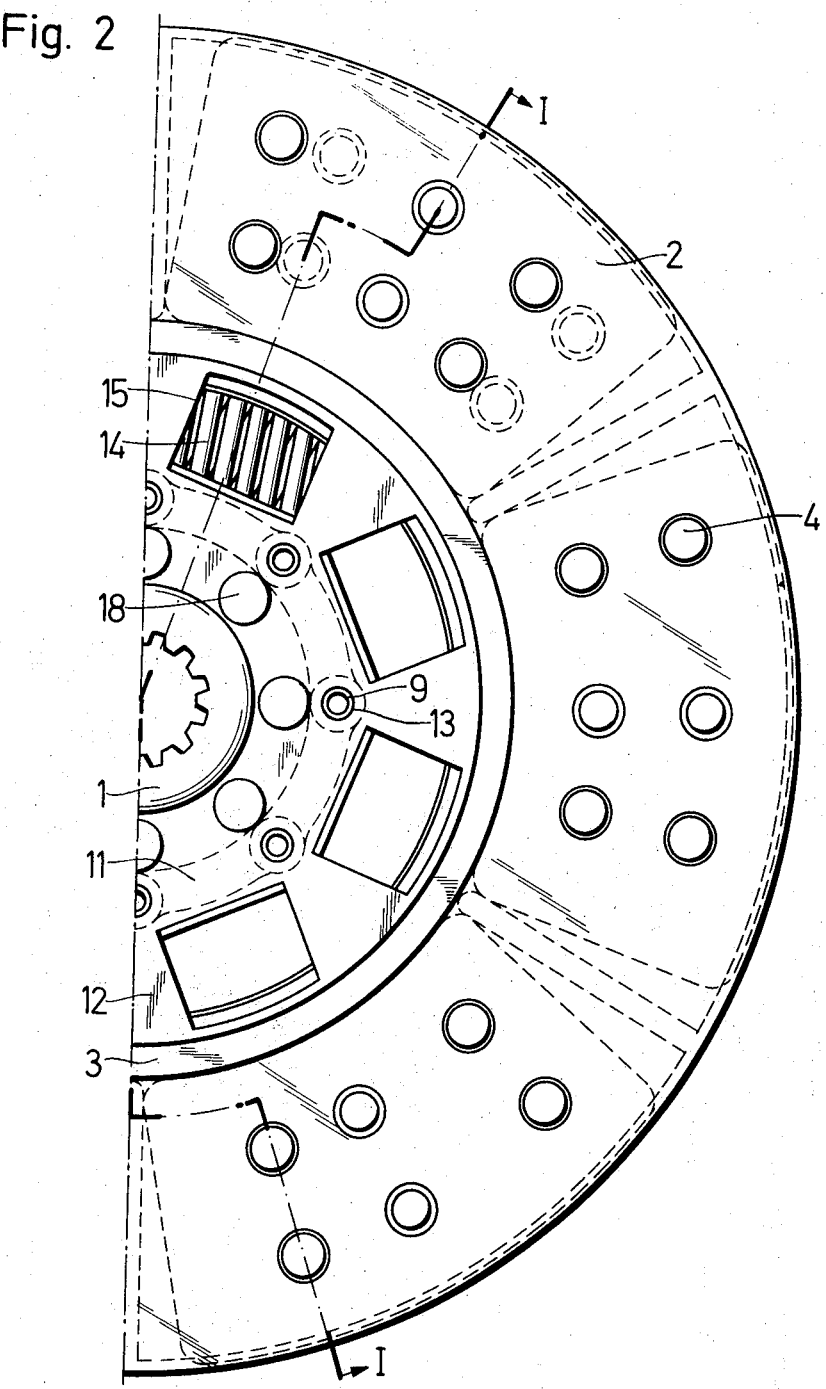
FIG. 2 is a fragmentary view of the same disc assembly taken in the direction of its axis of rotation.

As is evident from joint consideration of FIGS. 1 and 2, eight helical compression springs 14 are set in respective sets of aligned openings, an opening 15 being provided in each cover plate 12 and an opening 16 in the carrier 3 and its reinforcing ring 8. The axes of the several springs are approximately tangential to a common circle about the axis of rotation of the disc assembly, but only one spring 14 has been illustrated in FIG. 2 for the sake of simplicity.

The openings 13 in the one cover disc 12 are angularly interposed between the openings 15 so as not unduly to weaken the cover, and the semicircular projections 17 similarly strengthen the pressure plate 11, thereby permitting a clutch of relatively small diameter to carry radially wide friction facings 2. The projections 17, in addition to strengthening the peripheral portion of the pressure disc 11, further provide abutments for cup springs whose diameter is much greater than that of the associated pin element 9. The projections 17 therefore radially extend to a circle defined by the inner walls of the openings 15, 16.

The compactness of the friction coupling is further enhanced by the fact that the main radius of each friction ring 7, that is, the mean between the inner radius and the outer radius of each ring, is smaller than the radial spacing of the center of each opening 13 in the cover disc 12 which receives a pin element 9, from the axis of disc rotation.

Cup springs or Belleville washers are staple articles of commerce and available in a wide variety of sizes and resilient characteristics. The illustrated driven disc assembly may thus be produced economically to standard dimensions of all elements other than the springs 10, and small batches of the long initial run may be adapted to specific requirements by assembling them with suitable cup springs. A spare part stock may be limited to one standard disc assembly and an assortment of cheap cup springs, yet be sufficient for supplying driven-disc assemblies as replacements for many types of motorcars requiring very different damping properties in the friction couplings between the hub and friction facings.

The tubular pin elements 9 have been found to connect the hub 1 to the pressure plate 11 in a most reliable manner so as to avoid wear during long-time use. The pressure of the eight sets of cup springs is uniformly distributed over the circumference of the pressure plate, thereby ensuring uniform contact pressure over the entire interface of the plate 11 and the adjacent friction ring 7, a feature which greatly extends the useful life of the clutch assembly.

While the invention has been described with reference to a driven-disc assembly in which the pressure plate 11 is connected by the integral pin elements 9 to the cover disc 12, the position of the several elements in the friction coupling may be reversed in an obvious manner so that the pin elements 9 engage openings in the reinforcing ring 8, the cup springs 10 are interposed between the ring 8 and the plate 11, and both friction rings 7 make contact with respective cover plates 12. The apparatus disclosed is capable of yet other permutations and variations in an obvious manner.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a driven disc assembly for a friction clutch including a hub member having an axis of rotation and provided with means for securing the hub member to a driven shaft;
   an annular carrier member coaxial with said hub member;
   a friction facing on said carrier member; and
   torque transmitting means operatively interposed between said carrier member and said hub member for transmitting torque therebetween, said torque transmitting means including yieldably resilient means impeding relatively angular displacement of said members about said axis, and
   friction coupling means for damping angular oscillation of said members relative to each other, the improvement in said friction coupling means which comprises:
   a. a pressure plate having two radially extending, opposite faces;
   b. securing means securing said plate to one of said members for joint rotation while permitting axial movement of said plate relative to said one member, said securing means including a plurality of pin elements projecting axially from one of said faces in angularly spaced relationship, and receptacle means on said one member defining respective openings, said openings movably receiving said pin elements;
   c. a friction ring arranged axially adjacent the other face of said plate for axial movement toward and away from a position of frictional, torque transmitting engagement with the other one of said members; and
   d. at least one cup spring associated with each pin element and interposed between said one face and said receptacle means.

2. In an assembly as set forth in claim 1, said cup springs being substantially conically dished and formed with a central aperture, each pin element being received in the aperture of the at least one associated cup spring.

3. In an assembly as set forth in claim 2, said pin elements and said plate jointly constituting an integral, unitary body.

4. In an assembly as set forth in claim 2, two annular cover members fixedly fastened to said hub member in axially spaced relationship, one of said cover members constituting said receptacle means, said carrier member being axially interposed between said cover members, said pressure plate and said friction ring being axially interposed between said carrier member and said one cover member, and another friction ring axially interposed between said carrier member and the other cover member.

5. In an assembly as set forth in claim 4, said carrier member and said cover member being each formed with a plurality of circumferentially spaced openings therethrough, respective openings of said cover members and of said carrier member constituting sets of axially aligned openings, said yieldably resilient means including a plurality of helical springs respectively received in said sets of openings, each helical spring having an axis approximately tangential to a circle about said axis of rotation, said openings of said one cover member being angularly interposed between two of said sets relative to said axis of rotation.

6. In an assembly as set forth in claim 5, said friction rings having each an inner radius and an outer radius, the mean of the inner and outer radii of each friction ring being smaller than the radial spacing of the center of each opening in said one cover ring from said axis of rotation.

7. In an assembly as set forth in claim 6, said pressure plate having an outer circumference and a plurality of radial projections on said circumference, said projections being radially aligned with said pin elements respectively and approximately semicircular in a plane transverse to said axis of rotation.

* * * * *